(12) United States Patent
Hasegawa et al.

(10) Patent No.: US 10,711,891 B2
(45) Date of Patent: Jul. 14, 2020

(54) VEHICLE SPEED-CHANGE SYSTEM

(71) Applicant: SUZUKI MOTOR CORPORATION, Hamamatsu-Shi, Shizuoka (JP)

(72) Inventors: Kei Hasegawa, Hamamatsu (JP); Koichi Tanaka, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 539 days.

(21) Appl. No.: 15/592,454

(22) Filed: May 11, 2017

(65) Prior Publication Data

US 2017/0350506 A1 Dec. 7, 2017

(30) Foreign Application Priority Data

Jun. 6, 2016 (JP) .................................. 2016-112811

(51) Int. Cl.
| | |
|---|---|
| *F16H 63/18* | (2006.01) |
| *F16H 3/32* | (2006.01) |
| *F16H 63/30* | (2006.01) |
| *F16H 63/02* | (2006.01) |
| *B62M 7/04* | (2006.01) |
| *B62M 11/06* | (2006.01) |
| *B62M 25/02* | (2006.01) |
| *F16H 63/32* | (2006.01) |
| *F16H 3/089* | (2006.01) |
| *F16H 57/02* | (2012.01) |
| *B62K 25/28* | (2006.01) |
| *B62M 9/06* | (2006.01) |

(52) U.S. Cl.
CPC .............. *F16H 63/18* (2013.01); *B62M 7/04* (2013.01); *B62M 11/06* (2013.01); *B62M 25/02* (2013.01); *F16H 63/304* (2013.01); *F16H 63/32* (2013.01); *B62K 25/283* (2013.01); *B62M 9/06* (2013.01); *F16H 3/089* (2013.01); *F16H 3/32* (2013.01); *F16H 2057/02065* (2013.01); *F16H 2200/0043* (2013.01)

(58) Field of Classification Search
CPC .......... F16H 63/18; F16H 3/32; F16H 63/304; F16H 63/32
USPC ........................................................ 74/337.5
See application file for complete search history.

(56) References Cited

U.S. PATENT DOCUMENTS

| | | | | |
|---|---|---|---|---|
| 5,704,251 A | * | 1/1998 | Alber | ...................... F16H 63/20 74/325 |
| 6,296,073 B1 | * | 10/2001 | Rioux | ...................... B60K 5/02 180/233 |

(Continued)

FOREIGN PATENT DOCUMENTS

JP 2007285448 A 11/2007

*Primary Examiner* — Ha Dinh Ho
(74) *Attorney, Agent, or Firm* — Troutman Sanders LLP

(57) ABSTRACT

Provided is a vehicle speed-change system including the following: a transmission positioned to the rear of a crank shaft of an engine; a transmission case that retains the transmission; a shift mechanism that has a shift cam which performs a speed-change operation of the transmission; and a shift actuator that operates the shift cam. The transmission includes a counter shaft positioned to the rear of the crank shaft, and a drive shaft to which rotation of the counter shaft is transmitted. The shift cam is positioned further to the rear than the counter shaft, and the shift actuator is arranged in a rear portion of the transmission case and to the rear of the shift cam.

8 Claims, 8 Drawing Sheets

(56) References Cited

U.S. PATENT DOCUMENTS

| | | | | |
|---|---|---|---|---|
| 7,878,085 B2* | 2/2011 | Keyaki | ................... | F02B 61/06 |
| | | | | 74/337.5 |
| 8,082,816 B2* | 12/2011 | Lai | ......................... | F16D 28/00 |
| | | | | 74/337.5 |
| 8,337,363 B2* | 12/2012 | Minami | ................... | B62M 7/02 |
| | | | | 477/180 |
| 8,948,989 B2* | 2/2015 | Saitoh | ..................... | F16D 48/06 |
| | | | | 192/3.51 |
| 2007/0240955 A1 | 10/2007 | Zenno | | |
| 2008/0103663 A1* | 5/2008 | Hiroi | ...................... | F16D 11/10 |
| | | | | 701/54 |
| 2009/0270224 A1* | 10/2009 | Minami | ................... | B62M 7/02 |
| | | | | 477/101 |
| 2010/0100288 A1 | 4/2010 | Zenno | | |
| 2012/0118091 A1* | 5/2012 | Yamazaki | ............... | F16H 3/089 |
| | | | | 74/352 |

* cited by examiner

VEHICLE SPEED-CHANGE SYSTEM

CROSS-REFERENCE TO RELATED APPLICATIONS

This application is based upon and claims the benefit of priority of the prior Japanese Patent Application No. 2016-112811, filed on Jun. 6, 2016, the entire contents of which are incorporated herein by reference.

BACKGROUND OF THE INVENTION

Field of the Invention

The present invention is related to a vehicle speed-change system.

Description of the Related Art

A vehicle speed-change system is known in which speed change is performed by changing the combination of speed-change gears within a transmission by means of a shift actuator in accordance with a shift operation of a rider.

In an automatic speed-change device disclosed in Patent Document 1, during a gear change, a rod reciprocates by the driving of a shift actuator and a shift cam rotates through a predetermined angle via a link mechanism. Thereby, a shift fork moves by a predetermined amount in the axial direction along a cam groove, and a pair of speed-change gears enter a state in which they are fixed to a main shaft and a drive shaft, and thus a drive force is transmitted from the main shaft to the drive shaft.
Patent Document 1: Japanese Laid-open Patent Publication No. 2007-285448

However, a relatively large space is required to arrange a shift actuator like that disclosed in Patent Document 1, and thus depending on the arrangement position, the shift actuator may be affected by a heat source such as the engine.

SUMMARY OF THE INVENTION

In consideration of the above-described problem, an object of the present invention is to provide a vehicle speed-change system in which the effect on the shift actuator from a heat source can be reduced.

The present invention is a vehicle speed-change system including the following: a transmission positioned to the rear of a crank shaft of an engine; a transmission case that retains the transmission; a shift mechanism that has a shift cam which performs a speed-change operation of the transmission; and a shift actuator that operates the shift cam. The transmission includes a counter shaft positioned to the rear of the crank shaft, and a drive shaft to which rotation of the counter shaft is transmitted. The shift cam is positioned further to the rear than the counter shaft, and the shift actuator is arranged in a rear portion of the transmission case and to the rear of the shift cam.

DETAILED DESCRIPTION OF THE PREFERRED EMBODIMENTS

Figure 1:
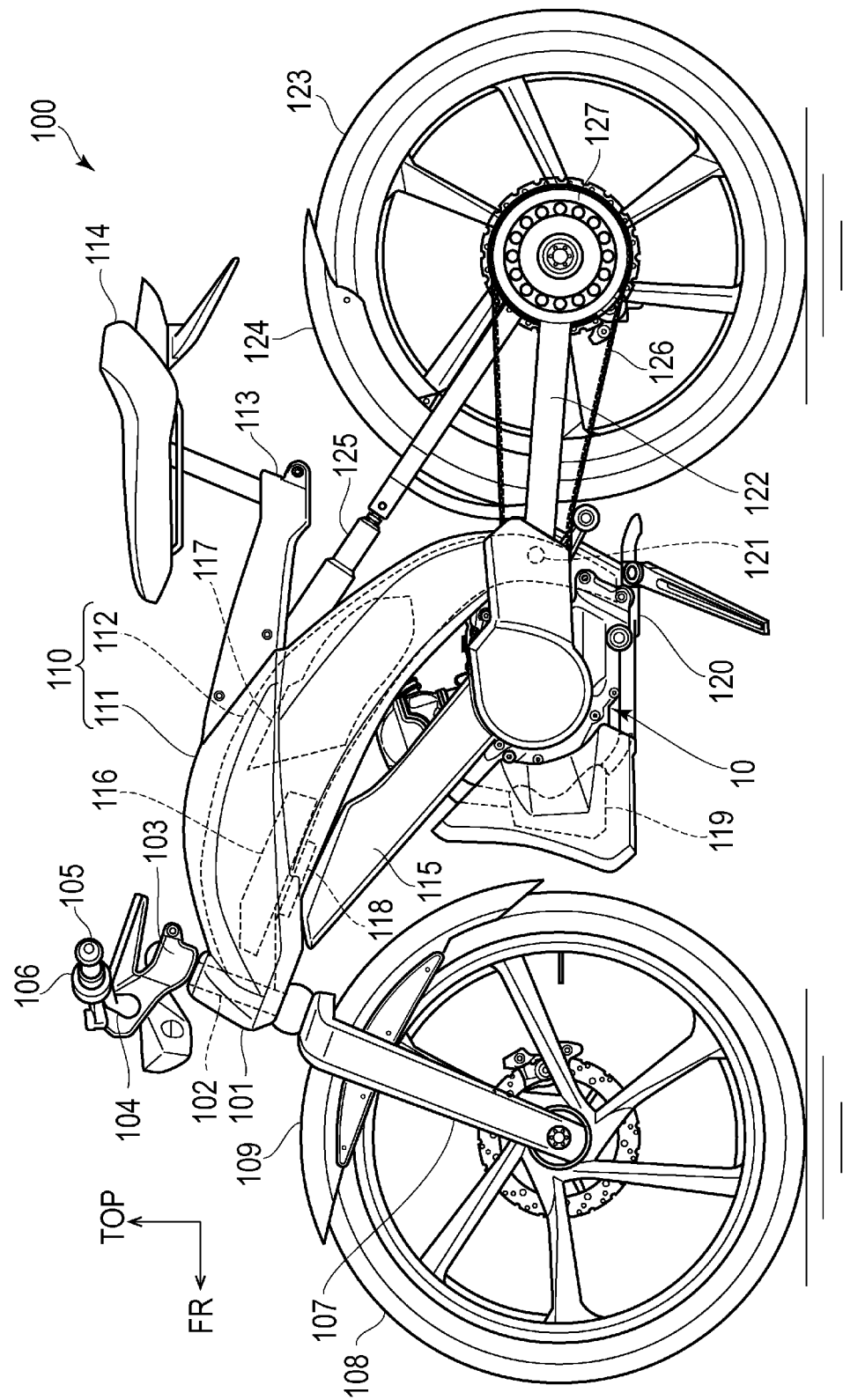
FIG. 1 is a left-side surface view illustrating the overall constitution of a motorcycle.

A suitable embodiment of a vehicle speed-change system according to the present invention will now be explained below referring to the drawings. In the present embodiment, a saddle-type vehicle, specifically a motorcycle, will be used as the vehicle.

First Embodiment

FIG. 1 is a left-side surface view illustrating the overall constitution of a motorcycle 100. In the drawings to be explained below, the front side of the vehicle is indicated by an arrow marked "FR", the top side of the vehicle is indicated by an arrow marked "TOP", and the left side of the vehicle is indicated by an arrow marked "LEFT" as necessary. Thus, the side opposite to that indicated by the arrow marked "FR" is the rear side, the side opposite to that indicated by the arrow marked "TOP" is the bottom side, and the side opposite to that indicated by the arrow marked "LEFT" is the right side.

In the front part of the motorcycle 100, a steering stem shaft 102 is supported such that it can rotate left and right by a steering head pipe 101. A handlebar 104 is fixed via a top bridge 103 to the upper end of the steering stem shaft 102. Grips 105 are attached to both ends of the handlebar 104. A shift switch 106, with which a rider performs a shift operation, is disposed at a position near one of the left and right grips 105. The rider can perform a shift-up or shift-down operation using the shift switch 106. A front fork 107 is provided to the lower end of the steering stem shaft 102. The front fork 107 extends to the left side of the vehicle, and rotatably supports a front wheel 108 in a cantilever manner. The top of the front wheel 108 is covered by a front fender 109.

A vehicle body frame 110 that extends diagonally downward to the rear in an arc shape is joined to the steering head pipe 101. The vehicle body frame 110 includes an exterior frame 111 that is exposed to the outside, and a reinforcement frame 112 that reinforces the exterior frame 111. The exterior frame 111 has a shape in which the top part and the left and right are integrally connected at the rear of the steering head pipe 101, and then the top part subsequently opens and branches to the left and right. The reinforcement frame 112 is, for example, a flat steel plate, and is constituted by a left and right pair of flat steel plates that are joined to the exterior frame 111 on the inside of the exterior frame 111.

A seat frame 113 is supported by the vehicle body frame 110. The seat frame 113 is connected to a V-shaped location where the exterior frame 111 of the vehicle body frame 110 branches to the left and right, and extends to the rear to support a seat 114.

A single-cylinder engine 10 is mounted on the vehicle body frame 110. The constitution of the engine 10 and the surroundings of the engine 10 will be explained later. The left and right of the engine 10 are covered by a cover 115 that extends diagonally downward to the rear.

A fuel tank 116 and an air cleaner box 117 are disposed from front to rear above the engine 10, between the left and right pair of reinforcement frames 112, and to the rear of the steering head pipe 101. An ECU 118 is disposed below the fuel tank 116. The ECU 118 controls the driving of the engine 10, and controls a clutch actuator 38 and a shift actuator 60 (to be explained later) in accordance with a shift operation of the rider. A chamber 119 is disposed in front of the engine 10. A muffler 120 is connected via an exhaust pipe to the chamber 119.

A swing arm pivot 121 is stretched between the left and right pair of reinforcement frames 112 at a lower rear part of the vehicle body frame 110. The swing arm pivot 121 is a pivot fulcrum of a swing arm 122, and the swing arm pivot 121 axially supports the swing arm 122 such that it can swing. The swing arm 122 extends to the rear of the vehicle, and rotatably supports a rear wheel 123 at the rear end thereof. The front and top of the rear wheel 123 are covered by a rear fender 124. A rear wheel suspension device including a shock absorber 125 is mounted between the vehicle body frame 110 and the swing arm 122. The rear wheel 123 is driven via a driven sprocket 127 onto which a belt 126 that transmits a motive force of the engine 10 is wound.

Figure 2:
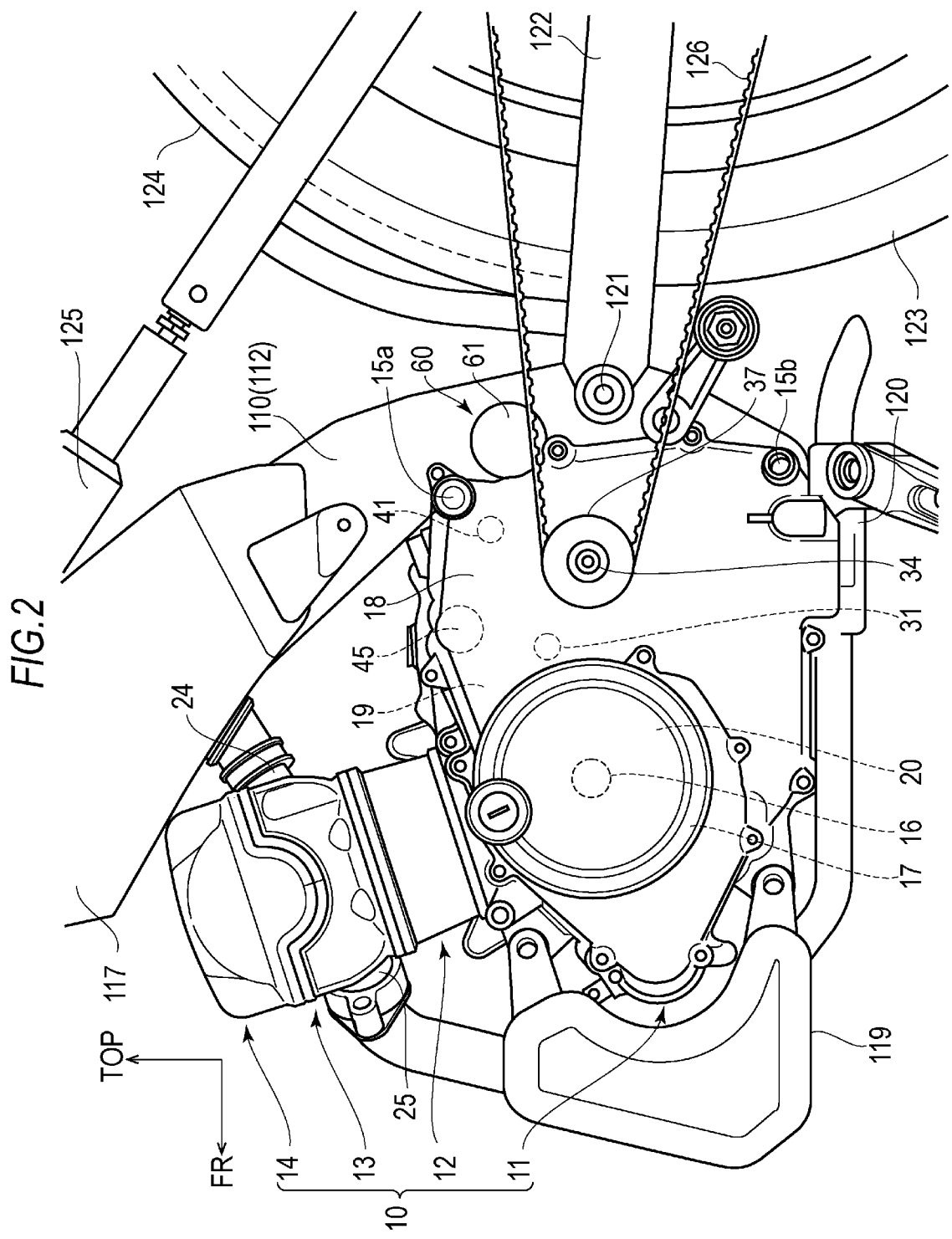
FIG. 2 is a left-side surface view illustrating the constitution around an engine.
Figure 3:
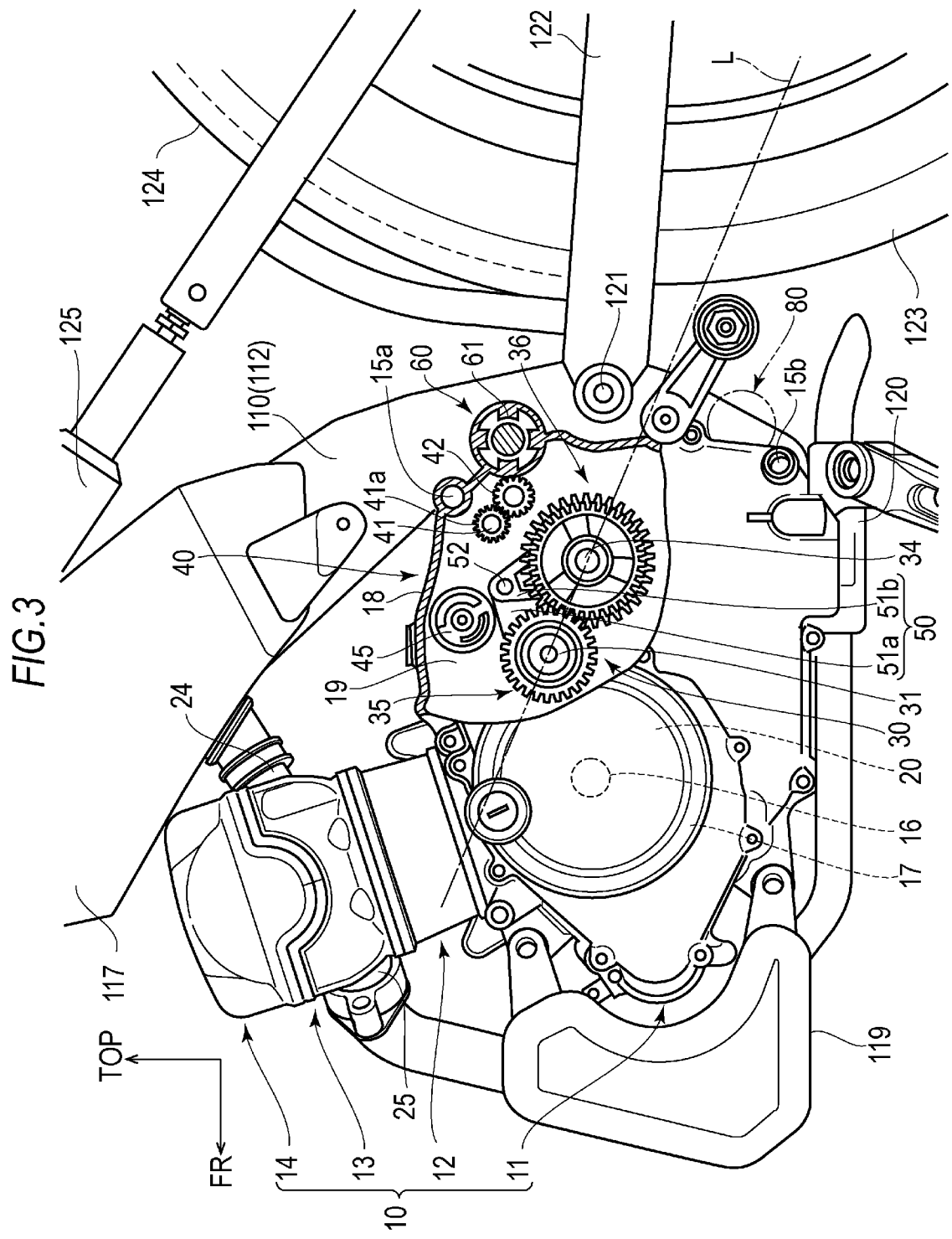
FIG. 3 is a partial cross-section view illustrating the constitution within a transmission case.
Figure 4:
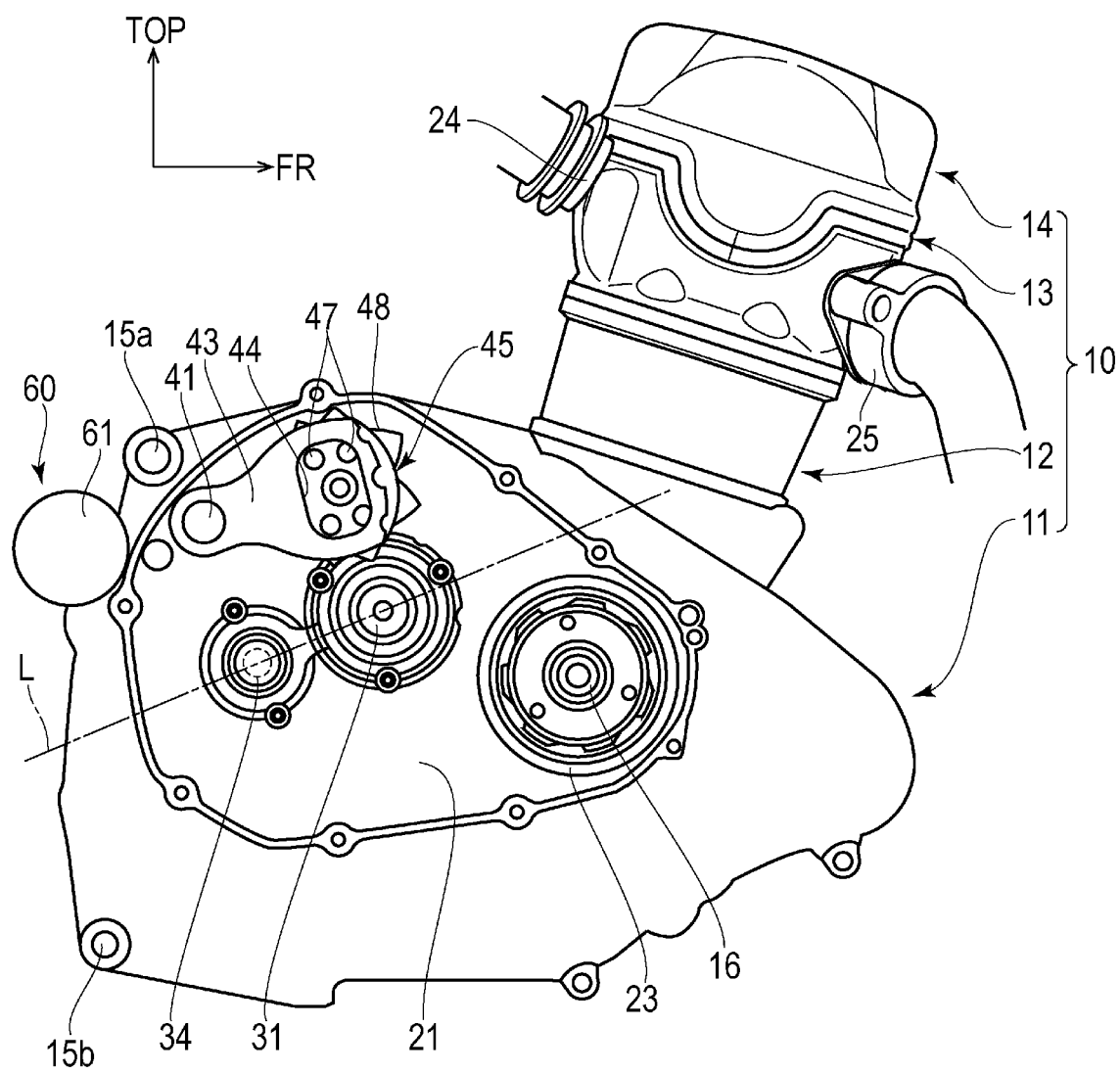
FIG. 4 is a right-side surface view illustrating the constitution around the engine.
Figure 5:
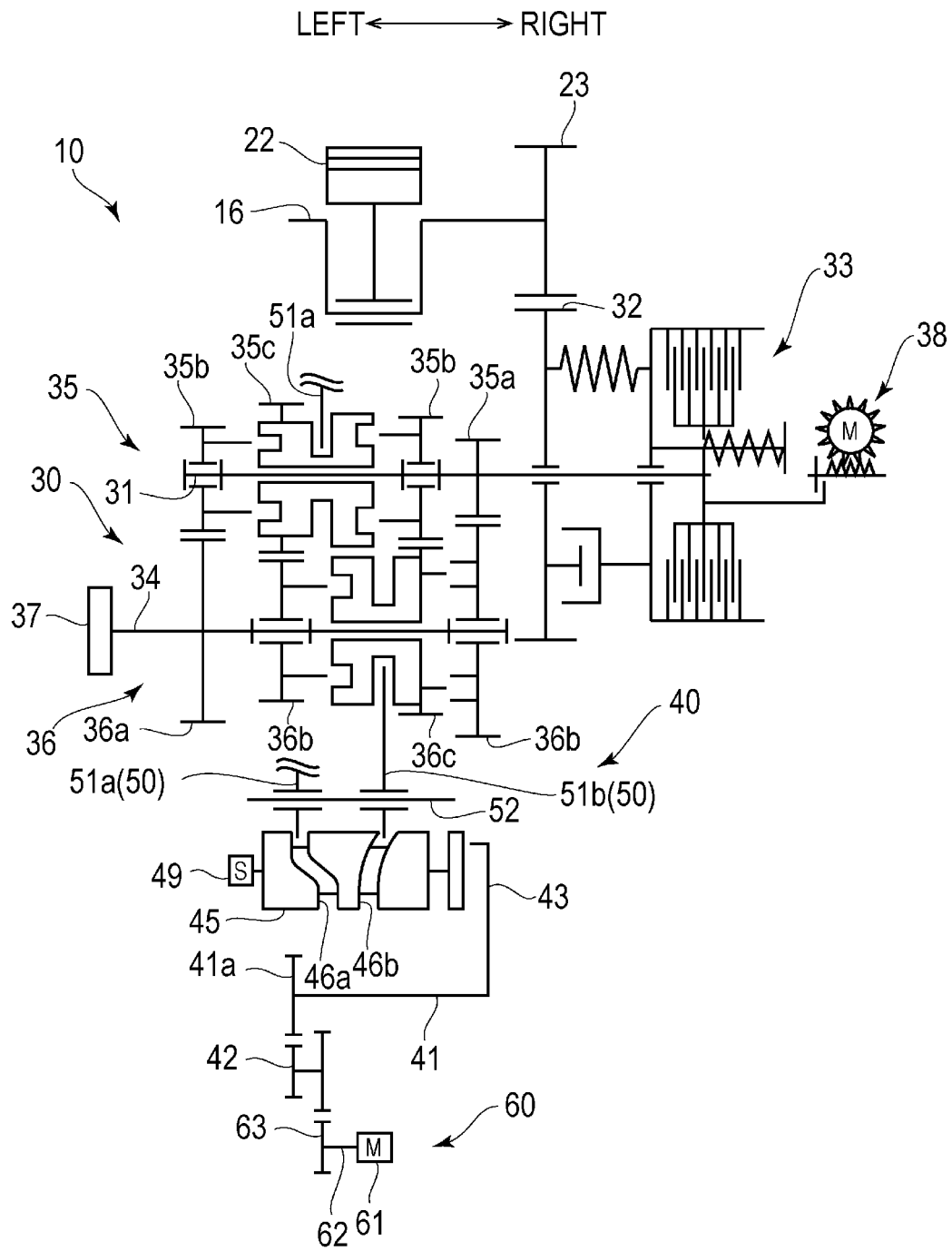
FIG. 5 is a schematic view illustrating the constitution of a speed-change system according to a first embodiment.

Next, the vehicle speed-change system according to the present embodiment will be explained referring to FIGS. 2 to 5. FIG. 2 is a left-side surface view illustrating the constitution around the engine 10. FIG. 3 is a partial cross-section view illustrating the constitution within a transmission case 18. FIG. 4 is a right-side surface view illustrating the constitution around the engine 10, and illustrates a state in which a clutch and a clutch cover have been removed. FIG. 5 is a schematic view illustrating the constitution of the vehicle speed-change system.

In the engine 10, the following are integrally joined: a crank case 11; a cylinder block 12 that extends in a forward tilting manner from the crank case 11; a cylinder head 13 that is arranged on top of the cylinder block 12; and a cylinder head cover 14 that closes the cylinder head 13 from above. The engine 10 is joined to the vehicle body frame 110 via suspension parts 15a, 15b, etc. at upper and lower positions sandwiching the swing arm pivot 121.

The crank case 11 has a crank chamber 17 that rotatably accommodates a crank shaft 16. A transmission case 18 that accommodates and retains a transmission 30 to be explained later is integrally provided to the rear of the crank case 11. In other words, the crank case 11 includes a transmission chamber 19 on the rear side of the crank chamber 17. The crank case 11 also includes a magnet chamber 20 on the left side of the crank chamber 17, and a clutch chamber 21 on the right side of the crank chamber 17 and the transmission chamber 19 (refer to FIG. 4).

Within the cylinder block 12, a piston 22 (refer to FIG. 5) is arranged such that it can reciprocate along a cylinder axial direction. The reciprocation of the piston 22 is converted into rotation of the crank shaft 16. A combustion chamber is formed between the cylinder block 12 and the cylinder head 13.

In the cylinder head 13, an intake port 24 that communicates with the combustion chamber and an exhaust port 25 are formed. A spark plug is disposed on the cylinder head 13 such that it is partially exposed within the combustion chamber. In the cylinder head 13, an intake valve is disposed within the intake port 24, and an exhaust valve is disposed within the exhaust port 25.

The cylinder head cover 14 is attached as a lid to the top of the cylinder head 13 to cover a valve system which includes the intake valve and the exhaust valve.

Next, the speed-change system which changes the speed of the rotation of the crank shaft 16 in accordance with a shift operation performed by a rider and transmits it to the belt 126 will be explained.

As shown in FIG. 5, the speed-change system includes the following: the transmission 30; the transmission case 18 (refer to FIG. 2), a clutch actuator 38; a shift mechanism 40; and a shift actuator 60.

The transmission 30 includes a counter shaft 31, a clutch 33, a drive shaft 34, and a plurality of speed-change gear groups 35, 36 which are provided to the counter shaft 31 and the drive shaft 34.

As shown in FIG. 3, the counter shaft 31 and the drive shaft 34 are arranged parallel to the crank shaft 16 within the transmission chamber 19. The counter shaft 31 is axially supported in a rotatable manner by the transmission case 18 to the rear of the crank shaft 16. The drive shaft 34 is axially supported in a rotatable manner by the transmission case 18 to the rear of the crank shaft 16 and the counter shaft 31.

As shown in FIG. 5, a primary driven gear 32, which is constantly meshed with a primary drive gear 23 that is fixed to the right end of the crank shaft 16, is fixed to the right side of the counter shaft 31. The primary driven gear 32 is disposed within the clutch chamber 21 or near the clutch chamber 21, and the clutch 33 is provided immediately to the right side of the primary driven gear 32. The clutch 33 is covered by a clutch cover (not illustrated) from the right side of the crank case 11. The clutch 33 interrupts the transmission between the primary driven gear 32 and the counter shaft 31 by the driving of the clutch actuator 38. The clutch actuator 38 has a motor and a rack-and-pinion mechanism. The clutch actuator 38 disconnects and connects the clutch 33 based on an instruction from the ECU 118 upon operation of the shift switch 106 by the rider.

The speed-change gear groups 35, 36 are provided respectively to the counter shaft 31 and the drive shaft 34.

The speed-change gear group 35 provided to the counter shaft 31 includes the following: an integral rotating gear 35a that rotates integrally with the counter shaft 31; a free rotating gear 35b that is capable of relative rotation with respect to the counter shaft 31; and a slide rotating gear 35c that is capable of reciprocal movement in the axial direction of the counter shaft 31.

A dog clutch is provided to the slide rotating gear 35c and the free rotating gear 35b that is adjacent to the slide rotating gear 35c. If the slide rotating gear 35c and the free rotating gear 35b approach each other, the dog clutch enters a connected state, and the free rotating gear 35b rotates integrally with the counter shaft 31. On the other hand, if the slide rotating gear 35c and the free rotating gear 35b separate from each other, the dog clutch enters a disconnected state, and the free rotating gear 35b enters a state in which it is capable of relative rotation with respect to the counter shaft 31.

Similarly, the speed-change gear group 36 provided to the drive shaft 34 includes the following: an integral rotating gear 36a that rotates integrally with the drive shaft 34; a free rotating gear 36b that is capable of relative rotation with respect to the drive shaft 34; and a slide rotating gear 36c that is capable of reciprocal movement in the axial direction of the drive shaft 34.

The integral rotating gear 35a provided to the counter shaft 31 and the free rotating gear 36b provided to the drive shaft 34 are constantly meshed. Similarly, the integral rotating gear 36a provided to the drive shaft 34 and the free rotating gear 35b provided to the counter shaft 31 are constantly meshed. The shift mechanism 40 moves the slide rotating gears 35c, 36c in the axial direction of the counter shaft 31 or the drive shaft 34 by driving the shift actuator 60, and changes the combination of the speed-change gear groups 35, 36 that transmit rotation from the counter shaft 31 to the drive shaft 34.

A drive sprocket 37, which rotates integrally with the drive shaft 34 and onto which the belt 126 is wound, is fixed to the left end of the drive shaft 34. Therefore, the speed of the rotation of the crank shaft 16 is changed by the transmission 30 and output to the drive sprocket 37, and then transmitted to the rear wheel 123 via the belt 126 and the driven sprocket 127.

Next, the shift mechanism 40 which changes the combination of the speed-change gear groups 35, 36 will be explained.

The shift mechanism 40 is disposed in the transmission chamber 19, and includes the following: a shift shaft 41; a speed reduction gear 42; a shift arm 43; a shift cam 45; a shift cam sensor 49; a shift fork 50; and a shift fork shaft 52.

As shown in FIG. 3, the shift shaft 41 is disposed parallel to the crank shaft 16, and is axially supported in a rotatable manner at an upper rear position within the transmission case 18. The shift shaft 41 is positioned to the rear of and above the drive shaft 34. The shift shaft 41 is positioned the farthest toward the rear end among the constituent members of the shift mechanism 40 except for the speed reduction gear 42. In a side surface view of the vehicle, the shift shaft 41 is arranged above a straight line L (dot-dash line) that connects the center axis of the counter shaft 31 and the center axis of the drive shaft 34. The shift shaft 41 rotates via a gear 41a that meshes with the speed reduction gear 42 by the driving of the shift actuator 60. Specifically, the shift shaft 41 rotates in one direction in a shift-up operation, and rotates in the other direction in a shift-down operation. As shown in FIG. 4, a shift arm 43 that swings in accordance with the rotation of the shift shaft 41 is fixed to the right end of the shift shaft 41. The shift arm 43 has a plate shape which forms a spatula shape extending forward, and the shift arm 43 is disposed so as to cover the shift cam 45 from the right side. An approximately rectangular-shaped opening 44, which engages with a portion of the shift pins 47 (to be explained later) of the shift cam 45, is formed in the shift arm 43. The shift arm 43 swings in either the upward or downward direction centered on the shift shaft 41 in accordance with the rotation of the shift shaft 41, and is biased to return to a neutral state after swinging.

The shift cam 45 performs the speed-change operation in the transmission 30. The shift cam 45 is disposed parallel to the crank shaft 16, and is axially supported in a rotatable manner at an upper position within the transmission case 18. The shift cam 45 is positioned to the rear of and above the counter shaft 31. Specifically, the center axis of the shift cam 45 is more toward the rear than the center axis of the counter shaft 31. In a side surface view of the vehicle, the shift cam 45 is arranged above the straight line L that connects the center axis of the counter shaft 31 and the center axis of the drive shaft 34. As shown in FIG. 5, the shift cam 45 is a cylindrical cam, and cam grooves 46a, 46b are formed in a predetermined number and a predetermined shape on the outer peripheral surface of the shift cam 45. As shown in FIG. 4, a plurality of shift pins 47 are provided on the right end surface of the shift cam 45. Some of the plurality of shift pins 47 engage within the opening 44 of the shift arm 43. Therefore, when the shift arm 43 swings, the shift cam 45 rotates via a portion of the engaged shift pins 47. Once the shift arm 43 has returned to the neutral state after swinging, the shift arm 43 engages with shift pins 47 different from the shift pins 47 that were engaged in the neutral state before swinging.

On the outer peripheral surface at the right end of the shift cam 45, recessed positioning parts 48 are formed at equal intervals in the circumferential direction. The positioning parts 48 are biased in a direction in which a shift cam stopper (not illustrated) engages with the positioning parts 48, and by engaging with the positioning parts 48, the rotational position of the shift cam 45 is determined.

As shown in FIG. 5, the shift cam sensor 49 is arranged near the shift cam 45. The shift cam sensor 49 detects the rotational position of the shift cam 45, and transmits information of the detected rotational position to the ECU 118.

The shift fork 50 is supported such that it can reciprocate along the shift fork shaft 52. The shift fork shaft 52 is disposed parallel to the counter shaft 31 and the drive shaft 34, and is axially supported by the transmission case 18. The shift fork 50 is provided with a counter-side shift fork 51a and a drive-side shift fork 51b.

The counter-side shift fork 51a engages with the cam groove 46a of the shift cam 45, and also engages with the slide rotating gear 35c provided to the counter shaft 31. In FIG. 5, a portion of the counter-side shift fork 51a is omitted from the drawing. Meanwhile, the drive-side shift fork 51b engages with the cam groove 46b of the shift cam 45, and also engages with the slide rotating gear 36c provided to the drive shaft 34.

When the shift cam 45 rotates, the counter-side shift fork 51a and the drive-side shift fork 51b move in the axial direction of the shift fork shaft 52 according to the shapes of the cam grooves 46a, 46b. In accordance with the movement thereof, the counter-side shift fork 51a makes the slide rotating gear 35c move in the axial direction of the counter shaft 31. Meanwhile, in accordance with the movement thereof, the drive-side shift fork 51b makes the slide rotating gear 36c move in the axial direction of the drive shaft 34. Due to this movement of the slide rotating gears 35c, 36c, the transmission path from the counter shaft 31 to the drive shaft 34, or in other words the combination of the speed-change gear groups 35, 36, is changed.

The shift actuator 60 operates the shift cam 45 based on an instruction from the ECU 118 upon operation of the shift switch 106 by the rider. The shift actuator 60 includes a motor 61, and a gear 63 that is fixed to an output shaft 62 of the motor 61. The outer shape of the shift actuator 60 is approximately columnar, and the shift actuator 60 is integrally joined to the transmission case 18 such that the output shaft 62 of the motor 61 is oriented along the left-right direction of the vehicle, i.e. such that the lengthwise direction of the outer shape of the shift actuator 60 is parallel to the left-right direction.

As shown in FIGS. 2 and 3, the shift actuator 60 is provided at a rear part, specifically the rear end, of the transmission case 18. In other words, the shift actuator 60 is arranged to be separated toward the rear from the cylinder block 12 and the cylinder head 13. Further, the shift actuator 60 is positioned to the rear of the shift cam 45 and to the rear of the shift shaft 41. In addition, the shift actuator 60 is provided between the two suspension parts 15a and 15b of the engine 10.

The positional relationship between the shift actuator 60 and its surrounding members will now be explained further.

Figure 6:
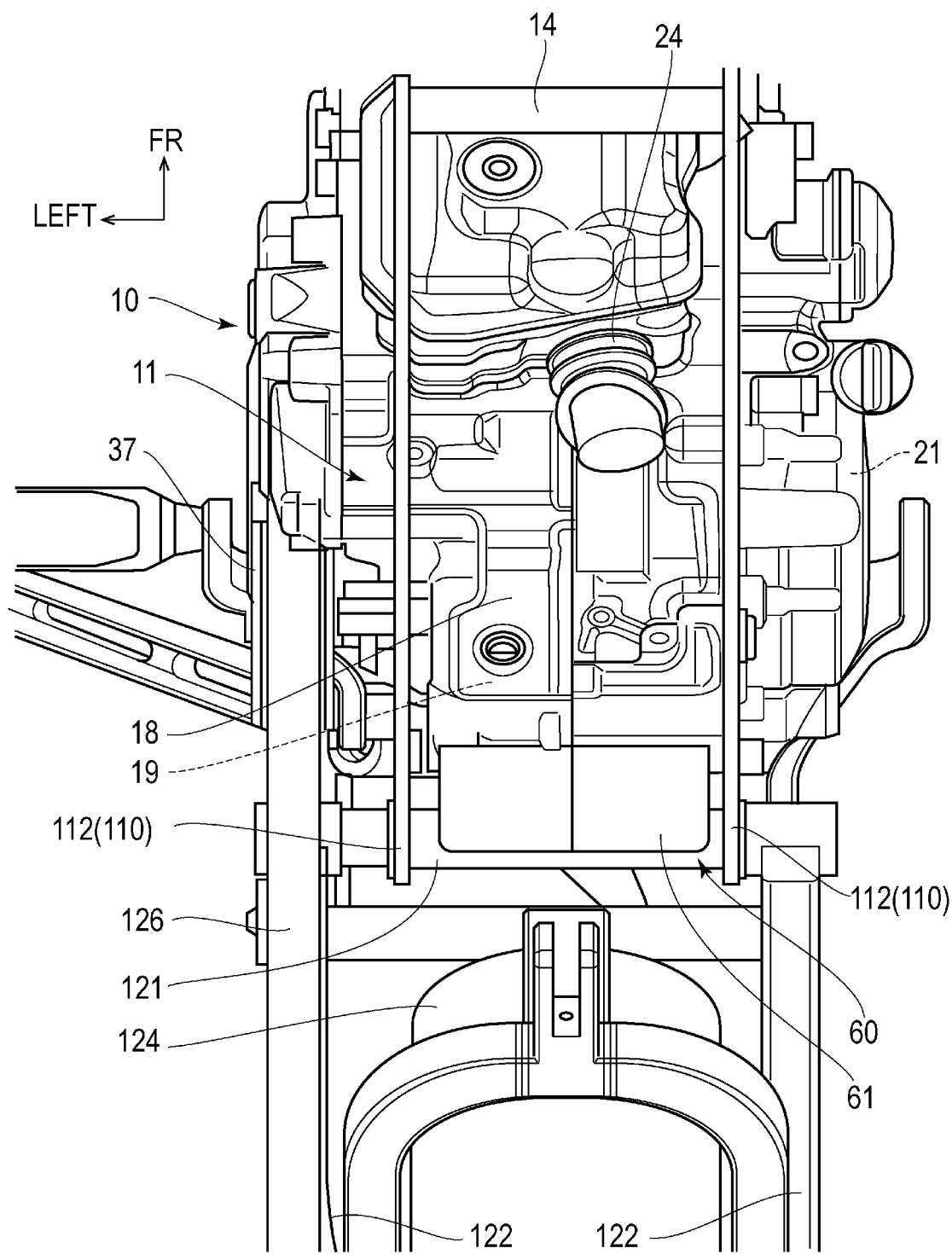
FIG. 6 is a plan view illustrating the constitution around a shift actuator.

FIG. 6 illustrates the constitution around the shift actuator 60 in a top surface view of the vehicle.

Figure 7:
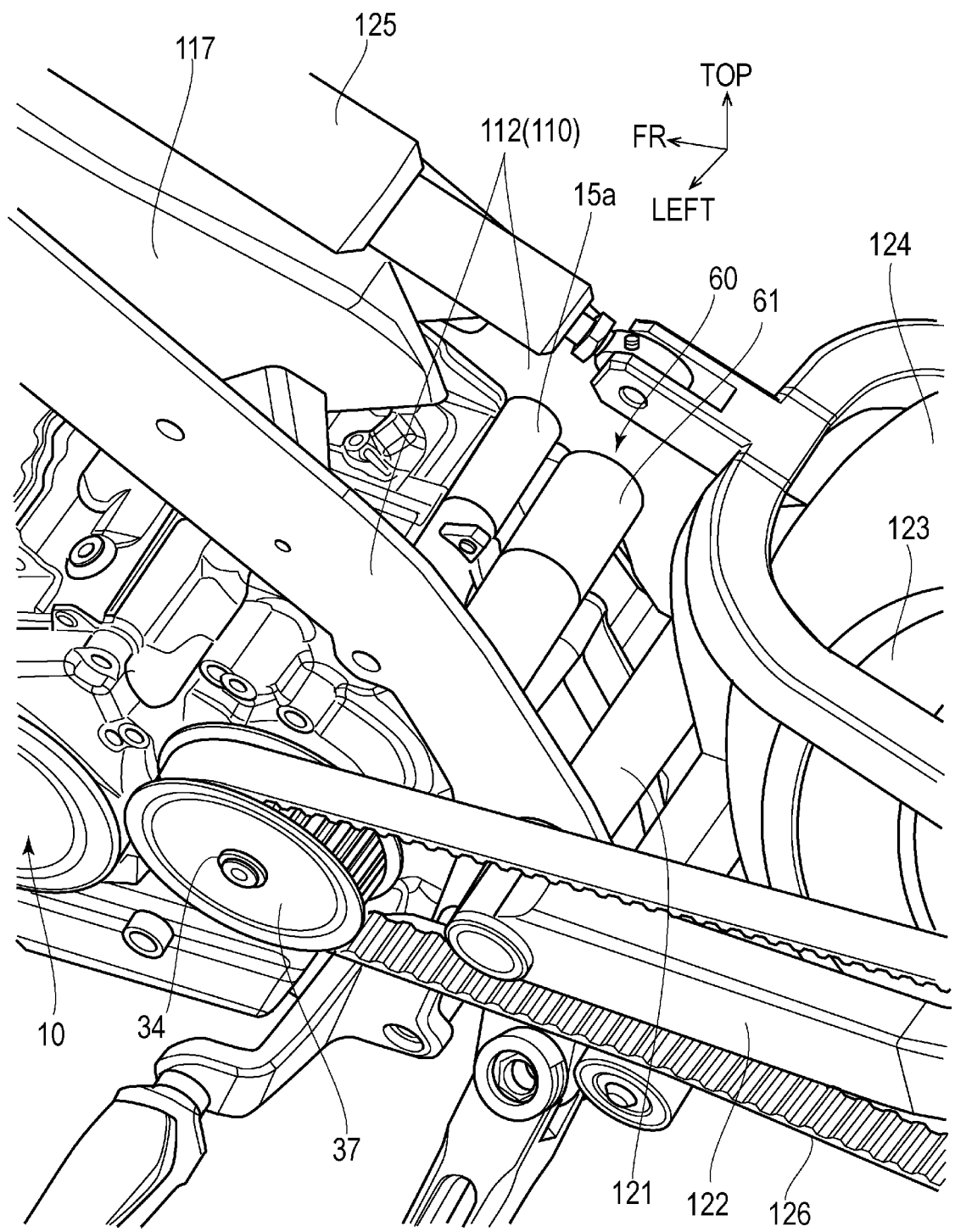
FIG. 7 is a perspective view illustrating the constitution around the shift actuator.

FIG. 7 is a perspective view illustrating the constitution around the shift actuator 60 when viewed from diagonally above the vehicle.

As shown in FIGS. 6 and 7, the shift actuator 60 is disposed between the left and right pair of vehicle body frames 110, specifically between the left and right pair of reinforcement frames 112. In other words, as shown in FIGS. 2 and 3, in a side surface view of the vehicle, the shift actuator 60 is disposed to overlap the reinforcement frames 112. In the present embodiment, the entirety of the shift actuator 60 overlaps the reinforcement frames 112, but the shift actuator 60 may partially overlap the reinforcement frames 112.

As shown in FIGS. 2 and 3, the shift actuator 60 is arranged above the swing arm pivot 121. Further, in a side surface view of the vehicle, the shift actuator 60 is arranged above the straight line L that connects the center axis of the counter shaft 31 and the center axis of the drive shaft 34. At this time, the shift actuator 60 faces the rear wheel 123 in the front-rear direction with the rear fender 124 therebetween. The motor 61 of the shift actuator 60 is arranged such that the output shaft 62 is parallel to the axis of the swing arm pivot 121. Further, as shown in FIG. 6, in a top surface view of the vehicle, the shift actuator 60 is arranged such that a portion thereof overlaps the swing arm pivot 121.

Next, in the speed-change system constituted as described above, the operation when a rider has performed a shift-up or shift-down operation using the shift switch 106 will be explained.

First, upon receiving shift-up or shift-down information from the shift switch 106, the ECU 118 drives the clutch actuator 38 to disconnect the clutch 33.

Herein, in the case that the ECU 118 has received shift-up information from the shift switch 106, the ECU 118 drives the motor 61 of the shift actuator 60 in one of the rotation directions for a predetermined time. Thus, rotation from the shift actuator 60 is transmitted to the shift shaft 41 via the speed reduction gear 42, and the shift cam 45 rotates by a fixed angle in a predetermined direction via the shift arm 43 from the shift shaft 41. Due to this rotation of the shift cam 45 in a predetermined direction, the shift fork 50 moves the slide rotating gears 35c, 36c to change the combination of the speed-change gear groups 35, 36, and thereby the shift-up speed change is performed automatically.

On the other hand, in the case that the ECU 118 has received shift-down information from the shift switch 106, the ECU 118 drives the motor 61 of the shift actuator 60 in the other rotation direction for a predetermined time. Thus, the shift cam 45 rotates in a direction different from the predetermined direction mentioned above. Due to this rotation, the shift fork 50 moves the slide rotating gears 35c, 36c to change the combination of the speed-change gear groups 35, 36, and thereby the shift-down speed change is performed automatically.

If an upper limit of shift-up or a lower limit of shift-down has been detected by the shift cam sensor 49, the ECU 118 performs a process to cancel the shift operation by the rider even if the ECU 118 has received information of a shift-up exceeding the upper limit or a shift-down exceeding the lower limit from the shift switch 106.

Finally, the ECU 118 drives the clutch actuator 38 to connect the clutch 33, and thereby the speed change by the speed-change system is completed.

According to the present embodiment described above, the transmission 30 includes the counter shaft 31 that is positioned to the rear of the crank shaft 16 and the drive shaft 34 to which rotation of the counter shaft 31 is transmitted, and the shift mechanism 40 includes the shift cam 45 that is positioned more toward the rear than the counter shaft 31. The shift actuator 60 is positioned at a rear portion of the transmission case 18 and to the rear of the shift cam 45. Therefore, since the shift actuator 60 can be separated from the cylinder block 12 of the engine 10 which is a heat source, the effect on the shift actuator 60 from the heat source can be reduced.

According to the present embodiment, the shift actuator 60 is further positioned at the rear end of the transmission case 18. Thus, it can be further separated from the cylinder block 12 of the engine 10 which is a heat source.

According to the present embodiment, in a top surface view of the vehicle, the shift actuator 60 is arranged such that at least a portion thereof overlaps the swing arm pivot 121, which is a pivot fulcrum of the swing arm 122 that supports the rear wheel 123. Therefore, the lengthwise direction of the shift actuator 60 can be arranged along the lengthwise direction of the swing arm pivot 121. Thus, the space for arranging the shift actuator 60 can be utilized effectively, and the size of the engine 10 can be reduced.

In the case of a vehicle in which the constituent members of the shift mechanism 40 extend in the left-right direction as in the present embodiment, the shift actuator 60 can be more optimally arranged by arranging the output shaft 62 of the shift actuator 60 along the left-right direction.

According to the present embodiment, the shift actuator 60 is disposed above the swing arm pivot 121. Therefore, the shift actuator 60 is positioned in front of the rear fender 124, and thus the shift actuator 60 can be protected from mud, splashing, etc. kicked up by the vehicle wheels (rear wheel 123).

According to the present embodiment, the shift actuator 60 is arranged between the left and right pair of vehicle body frames 110 so as to overlap the vehicle body frames 110 in a side surface view of the vehicle. Therefore, exposure of the shift actuator 60 to the outside can be suppressed, and the shift actuator 60 can be protected from impacts upon falling over or the like, flying stones, splashes, etc. Further, since the suspension part 15a that joins the engine 10 (the transmission case 18) to the vehicle body frames 110 can be brought close to the shift actuator 60, the shift actuator 60 can be stably supported. The shift actuator 60 does not have to be arranged so as to completely overlap the vehicle body frames 110, and may be arranged so as to partially overlap the vehicle body frames 110.

According to the present embodiment, the shift actuator 60 is arranged such that the output shaft 62 of the motor 61 is parallel to the axial direction of the swing arm pivot 121. Therefore, the shift actuator 60 does not protrude from the periphery of the engine 10, and can be accommodated between the pair of vehicle body frames 110.

According to the present embodiment, the shift actuator 60 operates the shift cam 45 via the shift shaft 41 and the shift arm 43. In this way, the shift actuator 60 can also be applied to the shift mechanism 40 which indirectly rotates the shift cam 45 via the shift shaft 41 and the shift arm 43.

Second Embodiment

In the first embodiment, a case was explained in which the shift actuator 60 indirectly rotates the shift cam 45 via the shift shaft 41 and the shift arm 43. In the present embodiment, a case will be explained in which the shift actuator 60 directly rotates the shift cam 45.

Figure 8:
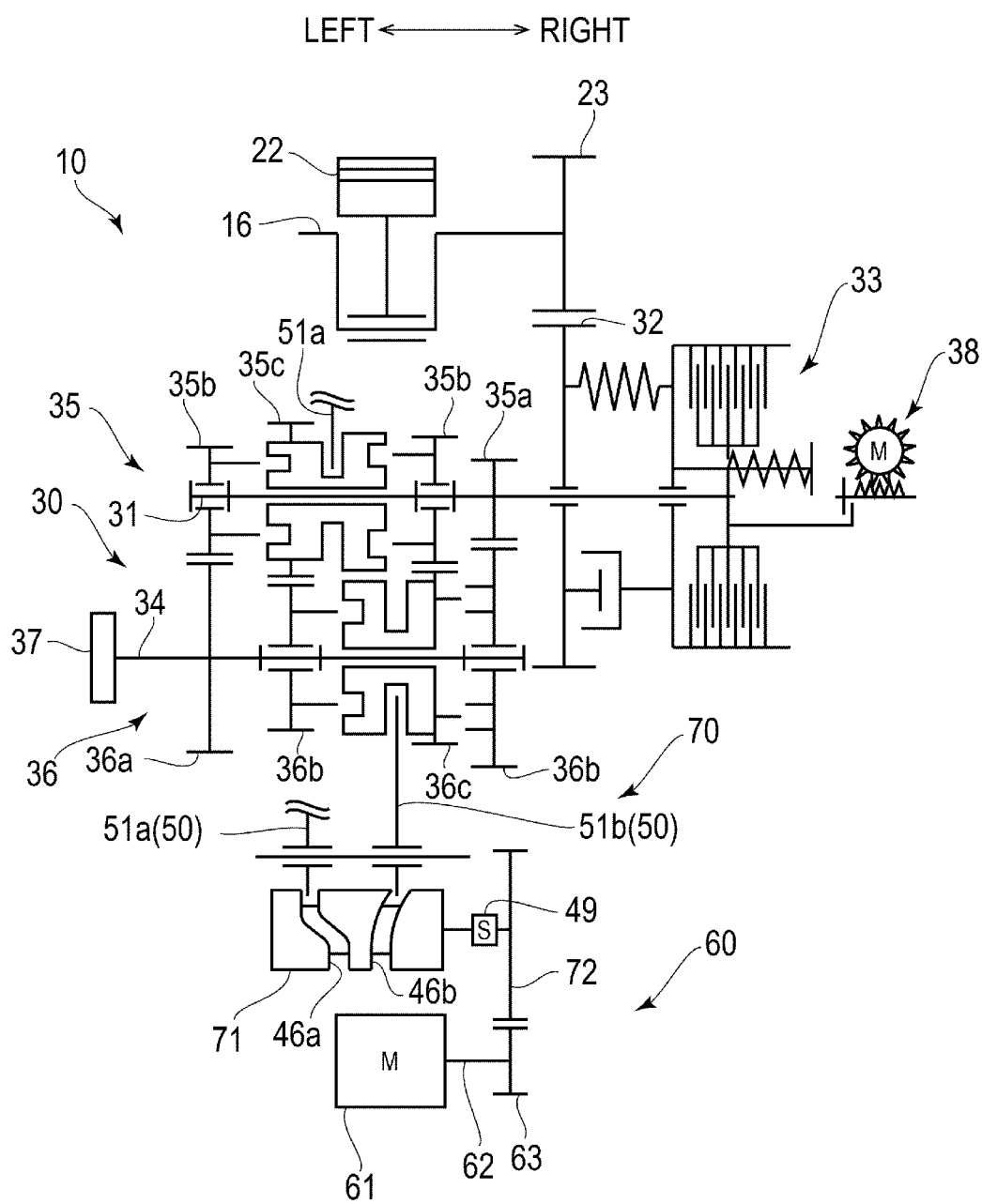
FIG. 8 is a schematic view illustrating the constitution of a speed-change system according to a second embodiment.

FIG. 8 is a schematic view illustrating the constitution of a speed-change system according to a second embodiment.

The constitutions which are identical to those of the first embodiment will be assigned the same reference numerals.

A shift mechanism 70 of the present embodiment includes the following: a shift cam 71; the shift cam sensor 49; the shift fork 50; and the shift fork shaft 52. A gear 72 is fixed via the shift cam sensor 49 to the shift cam 71. The gear 72 meshes with the gear 63 that is fixed to the output shaft 62 of the motor 61. In this way, in the shift mechanism 70 of the present embodiment, the shift shaft 41, the speed reduction gear 42, and the shift arm 43 of the shift mechanism 40 of the first embodiment are eliminated. Therefore, when the motor 61 of the shift actuator 60 rotates, the shift cam 45 can be made to rotate directly from the gear 63 that is fixed to the output shaft 62. Thus, the constitution of the speed-change system can be simplified, and the size of the engine 10 can be reduced. The shift cam sensor 49 which is positioned between the main body of the shift cam 71 and the gear 72 may be disposed on the opposite side of the gear 72.

The present invention has been explained above together with various embodiments, but the present invention is not limited to these embodiments. Modifications and the like are permissible within the scope of the present invention, and the embodiments above may be combined.

In the above embodiments, a case was explained in which the shift actuator 60 is disposed above the swing arm pivot 121, but the present invention is not limited thereto, and the shift actuator 60 may be disposed below the swing arm pivot 121. In FIG. 3, a shift actuator 80 indicated by a dot-dot-dash line is disposed below the swing arm pivot 121. Alternatively, the shift actuator may be disposed below the straight line L that connects the center axis of the counter shaft 31 and the center axis of the drive shaft 34. In this way, by disposing the shift actuator 80 below the swing arm pivot 121, the center of gravity of the motorcycle 100 can be lowered, and the running stability can be improved. In this case, the shift mechanism. 70 may also be disposed below the swing arm pivot 121 (or below the straight line L) similar to the shift actuator 80.

In the above embodiments, a case was explained in which the vehicle is a motorcycle, but the present invention is not limited thereto, and may be applied to three-wheeled or four-wheeled vehicles, etc. as long as the vehicle has a similar speed-change system. However, the shift actuator 60 can be more optimally arranged when the present invention is applied to a saddle-type vehicle, in which the axial direction of the counter shaft 31 and the drive shaft 34 of the transmission 30 is oriented along the left-right direction, and the axial direction of the shift cam 45 of the shift mechanism 40 and the shift fork shaft 52 is oriented along the left-right direction.

In the above embodiments, a case was explained in which the shift actuator 60 is disposed at a rear portion of the transmission case 18, but the clutch actuator 38 may be disposed at the position where the shift actuator 60 is disposed. In this case, the clutch actuator 38 disconnects and connects the clutch 33 by advancing/retreating, via a rack-and-pinion, a clutch release shaft that extends rearward from the clutch 33 through the inside of the clutch chamber 21 and the inside of the transmission chamber 19.

According to the present invention, the effect on the shift actuator from a heat source can be reduced.

What is claimed is:

1. A vehicle speed-change system comprising the following:

a transmission positioned to a rear of a crank shaft of an engine;

a transmission case that retains the transmission;

a shift mechanism that has a shift cam which performs a speed-change operation of the transmission; and a shift actuator that operates the shift cam, wherein the transmission comprises a counter shaft positioned to the rear of the crank shaft, and a drive shaft to which rotation of the counter shaft is transmitted, the shift cam is positioned further to the rear of the crank shaft than the counter shaft, and the shift actuator is arranged in a rear portion of the transmission case and to a rear of the shift cam, wherein, in a top surface view of the vehicle, the shift actuator is arranged such that at least a portion of the shift actuator overlaps a swing arm pivot, which serves as a pivot fulcrum of a swing arm that supports a wheel.

2. The vehicle speed-change system according to claim 1, wherein the shift actuator is disposed at a rear end of the transmission case.

3. The vehicle speed-change system according to claim 1, wherein the shift actuator is disposed above the swing arm pivot.

4. The vehicle speed-change system according to claim 1, wherein the shift actuator is disposed below the swing arm pivot.

5. The vehicle speed-change system according to claim 1, wherein the shift mechanism comprises:

the shift cam;

a shift arm that rotates the shift cam; and a shift shaft that swings the shift arm, the shift actuator operates the shift cam via the shift shaft and the shift arm, and the shift actuator is disposed to a rear of the shift shaft.

6. A vehicle speed-change system comprising the following:

a transmission positioned to a rear of a crank shaft of an engine;

a transmission case that retains the transmission;

a shift mechanism that has a shift cam which performs a speed-change operation of the transmission; and a shift actuator that operates the shift cam, wherein the transmission comprises a counter shaft positioned to the rear of the crank shaft, and a drive shaft to which rotation of the counter shaft is transmitted, the shift cam is positioned further to the rear of the crank shaft than the counter shaft, and the shift actuator is arranged in a rear portion of the transmission case and to a rear of the shift cam, wherein the shift actuator is disposed between a left and right pair of vehicle body frames so as to at least partially overlap the vehicle body frames in a side surface view of the vehicle.

7. The vehicle speed-change system according to claim 6, wherein a swing arm pivot, which serves as a pivot fulcrum of a swing arm that supports a wheel, is stretched between the left and right pair of vehicle body frames, and the shift actuator is arranged such that an output shaft thereof is parallel to an axial direction of the swing arm pivot.

8. The vehicle speed-change system according to claim 6, wherein the shift mechanism comprises:

the shift cam;

a shift arm that rotates the shift cam; and a shift shaft that swings the shift arm, the shift actuator operates the shift cam via the shift shaft and the shift arm, and
the shift actuator is disposed to a rear of the shift shaft.

\* \* \* \* \*